United States Patent Office 3,038,107
Patented June 5, 1962

3,038,107
LIQUID DIELECTRIC COMPOSITIONS, METHOD OF PREPARATION AND USE THEREOF
Harold I. Weingarten, Dayton, Ohio, assignor to Monsanto Chemical Company, St. Louis, Mo., a corporation of Delaware
No Drawing. Filed June 8, 1959, Ser. No. 818,530
17 Claims. (Cl. 317—258)

The invention relates to novel liquid dielectric compositions consisting of mixtures of polyhalogenated biphenyls characterized by a dielectric constant at up to at least about 100,000 cycles and 25° C. of about 7, and higher, and to the economical method of preparing same.

Halogenated organic compounds in general and various chlorinated biphenyls and mixtures thereof have been widely employed in the production of dielectric and heat-exchanging media. These prior art chlorinated biphenyls are generally prepared by the direct chlorination of biphenyl in the presence of an iron catalyst to provide compositions preferably containing from about 40 to about 55 percent chlorine, as for example U.S. Patent No. 1,892,397. However, the various prior art chlorinated biphenyl compositions have heretofore appeared to be limited to maximum dielectric constants at 1000 cycles and 25° C. of about 5.8. Thus, for example, the prior art chlorinated biphenyls containing about 42 percent chlorine, about 48 percent chlorine and about 54 percent chlorine, respectively corresponding to about 3, about 4, and about 5 atoms of chlorine per biphenyl molecule, are reported to have dielectric constants at 1000 cycles and 25° C. of 5.8, 5.6 and 5.0.

It is the principal object of the present invention to provide novel compositions of polyhalogenated biphenyls having a dielectric constant at up to 100,000 cycles and 25° C. substantially greater than the apparent prior art maximum of about 5.8. Another object of this invention is to provide a process for the preparation of novel dielectric compositions wherein the product mixture is effected by a new catalyst system. A further object of this invention relates to the preparation of insulating elements for use in various electrical apparatus, whereby the novel liquid dielectric composition is impregnated in paper, fabric, and other porous materials. Other objects of this invention will be apparent to those skilled in the art from the following disclosure.

It has now been found that improved compositions of polyhalogenated biphenyls can be obtained by the further halogenation of the 2,4'-dihalobiphenyl isomer, e.g. 2,4'-dichlorobiphenyl. Whereas the halogen substituent initially employed and the further halogenation can be effected in whole or in part with the various members of the halogen group having an atomic number up to 53, i.e. fluorine, chlorine, bromine, and iodine, the chloro compositions are the preferred embodiment of the instant invention and will be employed hereinafter to more fully illustrate this invention. However, it will be understood that the aforesaid other halogen materials can be substituted in whole or in part in the various illustrative compositions.

One method by which the novel dielectric compositions can be prepared is to chlorinate biphenyl in the presence of an iron catalyst, such as a ferric chloride catalyst, at reaction temperatures preferably between about 40° C. and about 150° C., and more preferably still between about 100° C. and about 140° C., for example at a temperature of about 130° C., to provide a composition containing about 32 percent chlorine, corresponding to an average composition containing 2 atoms of chlorine per molecule of biphenyl, i.e. the dichlorobiphenyls. However, vapor phase chromatographic evaluation of this product indicates that it is a mixture of the following components, wherein the concentration of each fraction is in terms of mol percent: biphenyl 1.0; 2-chlorobiphenyl 17.9; 4-chlorobiphenyl 8.2; 2,2'-dichlorobiphenyl 13.9; 2,4-dichlorobiphenyl 5.7; 2,4'-dichlorobiphenyl 32.1; 4,4'-dichlorobiphenyl 12.5; and trichlorobiphenyls 8.7. This mixed "dichlorobiphenyl" composition is then subjected to fractional distillation to provide a composition rich in the 2,4'-dichlorobiphenyl fraction, preferably in an amount of at least about 80 mol percent. The enriched composition is then further chlorinated to a composition containing about 42 percent chlorine, corresponding to the trichlorobiphenyl. Whereas the prior art compositions containing about 42 percent chlorine and prepared by the direct chlorination of biphenyl had maximum dielectric constant values at 1000 cycles and 25° C. of about 5.8, the new trichlorobiphenyl composition prepared by the aforesaid method had corresponding dielectric constant values of about 7, and higher.

The aforesaid prior art chlorinated biphenyl containing about 42 percent chlorine was found by vapor phase chromatographic analysis to consist of the following components expressed in mol percent:

| | Percent |
|---|---|
| 2,2'-dichlorobiphenyl | 3.3 |
| 2,5-dichlorobiphenyl | 0.2 |
| 2,4'-dichlorobiphenyl | 8.7 |
| 4,4'-dichlorobiphenyl | 6.0 |
| 2,4,2'-trichlorobiphenyl | 4.0 |
| 2,3,2'-trichlorobiphenyl | 3.2 |
| 2,4,4'-trichlorobiphenyl | 12.4 |
| 3,4,2'-trichlorobiphenyl | 4.8 |
| 3,4,4'-trichlorobiphenyl | 8.1 |
| 2,4-dichlorobiphenyl | 0.2 |
| 2,3-dichlorobiphenyl | 0.1 |
| 3,4-dichlorobiphenyl | 0.1 |
| 2,6,2'-trichlorobiphenyl | 1.7 |
| 2,5,2'-trichlorobiphenyl | 8.0 |
| 2,6,4'-trichlorobiphenyl | 3.2 |
| 2,5,4'-trichlorobiphenyl | 6.0 |
| 2,3,4'-trichlorobiphenyl | 2.4 |
| Other 2,4',X-trichlorobiphenyl | 2.3 |
| And tetrachlorobiphenyls | 24.6 |

In contradistinction thereto the improved composition of the instant invention containing about 42 percent chlorine and prepared from the 2,4'-dichlorobiphenyl was found to contain about the following components expressed in mol percent:

| | Percent |
|---|---|
| 2,4'-dichlorobiphenyl | 20 |
| 2,6,4'-trichlorobiphenyl | 10 |
| 2,5,4'-trichlorobiphenyl | 10 |
| 2,3,4'-trichlorobiphenyl | 6 |
| 2,4,2'-trichlorobiphenyl | 10 |
| 2,4,4'-trichlorobiphenyl | 14 |
| 3,4,2'-trichlorobiphenyl | 10 |
| And tetrachlorobiphenyls | 20 |

It will be apparent that the term "2,4',X-trihalobiphenyl" employed in the instant claims means that the mixed composition is predominately a biphenyl molecule having a halogen atom substituent, as for example chlorine, at the 2 and 4' positions and additionally a third halogen atom at one of the remaining available positions.

Whereas the aforesaid method enables the production of improved dielectric compositions, it was found that the 2,4-dichlorobiphenyl isomer had a relative volatility close to the desired 2,4'-dichlorobiphenyl and was not readily separated therefrom by low-cost distillation procedures. It was then found that a modification of the chlorination procedure substantially completely eliminated the presence of the 4-chlorobiphenyl and 2,4-dichlorobiphenyl components in the reaction mixture and simultaneously effected an about 33 percent increase in the yield of 2,4'-dichlorobiphenyl, whereby the 2,4'-dichlorobiphenyl component can be more easily recovered from the reaction mixture. This improvement is directed to the use of a catalyst system consisting of an iron catalyst, such as ferric chloride, and sulfur. Preferably the sulfur is relatively finely divided such as commercially available powdered sulfur, e.g. known as "milk of sulfur," "flowers of sulfur," and the like. The quantity of ferric chloride and sulfur can be varied from about 0.05 to about 1.0, and from about 0.025 to about 0.5 weight percent, respectively, based on the biphenyl, and preferably are employed in amounts of the order of about 0.4 and 0.25 weight percent. The sulfur can be added together with the ferric chloride to the biphenyl or the biphenyl can be monochlorinated in the presence of the ferric chloride and then the sulfur added prior to further chlorination. It will be noted from the following illustrative examples that this further modification yields a substantially equivalent amount of the 2,4'-dichlorobiphenyl, which is free from the 2,4-isomer, but that the 4,4'-/2,2'-isomer ratio is substantially reduced. Also the 4,4'-isomer can be readily removed from the reaction mixture by fractional crystallization prior to fractional distillation of the reaction mixture.

The specific essentially trihalogenated biphenyl mixtures produced by the further halogenation of the 2,4'-dihalobiphenyl materials are particularly useful in the production of dielectric and heat-exchanging media in view of their high dielectric constants, excellent thermal stability, resistance to oxidation, non-flammability, etc. Thus, the novel compositions can be employed as electrical insulating and cooling media for transformers, cables, switches and other electrical apparatus, and as coating and impregnating compositions for paper, fabric, and other porous materials which can be employed in the production of capacitors, as wrapping for electrical cables, etc., e.g., electrical condensers can be produced by interleaving a plurality of porous sheets, such as linen or kraft paper, with a plurality of sheets of metal foil, such as aluminum or tin, and rolling the said interleaved sheets to effect the formation of the condenser. The rolled condenser can then be impregnated with the novel compositions of this invention by any suitable means, such as vacuum impregnation and the like.

The novel essentially trihalobiphenyl compositions of this invention can also be employed to upgrade the dielectric properties of various prior art chlorinated biphenyl compositions and other halogenated organic compounds as desired. Preferably the instant trihalobiphenyl compositions are present therein in a major amount, i.e. at least 50 weight percent of the new composition. Also small amounts of stabilizers, generally of the order of from about 0.05 to about 1 percent, based on the weight of the mixed halogenated organic composition, can be incorporated with the aforesaid compositions to act as scavengers for any hydrogen halide which may be present in the composition. Illustrative suitable stabilizers are dibutyl diphenyl tin, tetraphenyl tin, diphenyl tin diethylate, aluminum isopropylate, zinc dithiocarbamate and substituted derivatives thereof, aminated-N-phosphoryl-o-aminobiphenyl, o- and p-anisidine, p-nitroaniline, 2,4-diaminodiphenylamine, various organic antimony compounds, etc.

The following examples are illustrative of the instant invention:

*Example 1*

The prior art mixed chlorobiphenyl composition containing about 32 percent chlorine, corresponding to an average composition containing 2 atoms of chlorine per molecule of biphenyl, and having the composition shown herein above, wherein 2,4'-dichlorobiphenyl was present to the extent of about 32.1 mol percent, was fractionally distilled and the fraction collected over a boiling point range of 150° to 155° C. at 10 mm. of mercury was isolated. This fraction was found to contain greater than about 80 percent of 2,4'-dichlorobiphenyl by vapor phase chromatographic determination.

A 44-g. sample of the aforesaid enriched 2,4'-dichlorobiphenyl fraction was then introduced into a closed reaction vessel provided with a stirrer, an inlet and vapor exhaust line, and 0.1 g. of ferric chloride catalyst was mixed therein. The mixture was heated to about 100° C. and chlorine gas was introduced therein over a period of about one hour until a weight increase of 6.5 was obtained. Then heating and the introduction of chlorine were discontinued. The reaction mass was poured into about 100 ml. of pentane, dried over anhydrous magnesium sulfate, treated with decolorizing carbon, filtered and the filtrate distilled. A 48-g. fraction having a boiling point range of 155 to 200° C. at 10 mm. mercury pressure was recovered, which fraction was found to contain 40 percent chlorine, substantially corresponding to the average amount contained in the trichlorobiphenyl compositions. This improved mixed trichlorobiphenyl composition was a colorless liquid having a pour point of the order of about −20° C. and was found to have a dielectric constant at up to 100,000 cycles and 25° C. of from 7.20 to 7.15, a power factor at 100 cycles and 25° C. of <0.01%, and a volume resistivity at 25° and 500 volts D.C. of $6 \times 10^{13}$ ohm-cm.

*Example 2*

In similar fashion to Example 1, the prior art chlorobiphenyl composition containing about 32 percent chlorine was fractioned in an Oldershaw column to obtain a cut consisting of greater than 90 percent 2,4'-dichlorobiphenyl. A 30-g. sample of this fraction was then chlorinated to the trichloro stage in the presence of 0.1 g. of ferric chloride over a time of about 1.5 hours at temperatures ranging from about 82° to about 116° C. until a weight increase of 4.6 g. was obtained. The reaction mass was then treated as in Example 1 and 33.5 g. of product recovered, which product was found to contain 41 percent chlorine and the dielectric constant at 25° C. was found to be substantially constant at 7.2 over the range up to 100,000 cycles.

*Example 3*

A mixture of 30.8 g. biphenyl, 0.1 g. ferric chloride and 0.06 g. sulfur was obtained by introducing the aforesaid materials into the reaction vessel of Example 1. Chlorine was introduced over a period of about 2 hours during which time the temperature varied from 84° to 112° C. to effect a mixed composition containing about 32 percent chlorine, substantially corresponding to the dichlorobiphenyl material. This mixed composition was evaluated by vapor phase chromatographic analysis and found to consist of the following components: 2-chlorobiphenyl 1.1%; 2,2'-dichlorobiphenyl 12.3%; 2,4'-dichlorobiphenyl 44%; 4,4'-dichlorobiphenyl 28.9%; and trichlorobiphenyls 13.8%. It is noteworthy that the presence of the sulfur modification employed in this process substantially avoids the presence of 4-chlorobiphenyl and 2,4-dichlorobiphenyl in the mixture, the latter compound being somewhat difficult to efficiently remove from the desired 2,4'-isomer due to their close relative volatility. Also the 4,4'-isomer was observed to precipitate out of this mixture on standing at room temperature, whereby the remaining composition is further enriched as to the 2,4'-isomer and the said composition can be effectively fractionally distilled to recover the 2,4'-dichlorobiphenyl. The 2,4'-dichlorobiphenyl can then be further chlorinated to the trichlorobiphenyl stage in the presence of ferric chloride in a similar manner to the procedure of the foregoing examples.

*Example 4*

A further modification of Example 3 was run wherein 30 g. of biphenyl and 0.13 g. of ferric chloride were introduced into the reaction vessel of Example 1 and the biphenyl chlorinated to the monochlorobiphenyl stage over a period of 1 hour and over a temperature range of 95° to 150° C. Then addition of chlorine was terminated, the reaction mixture cooled to 40° C. and 0.079 g. of sulfur introduced thereto. Chlorine was again introduced over a period of 1 hour and the temperature was gradually raised to 77° C. during this time to retain the 4,4'-dichlorobiphenyl in the liquid phase. The heating and introduction of chlorine were terminated when the amount of chlorine absorbed corresponded to the dichlorobiphenyl stage. The catalyst mixture was removed and a sample of the reaction mixture analyzed by the vapor phase chromatographic method to determine the components contained therein, with the following results: 2-chlorobiphenyl 6.7%; 2,2'-dichlorobiphenyl 17.4%; 2,4'- dichlorobiphenyl 42.6%; 4,4'- dichlorobiphenyl 23.8%; and trichlorobiphenyls 9.5%. Again it is seen that the reaction mixture did not contain any detectable amount of 4-chlorobiphenyl or 2,4-dichlorobiphenyl. The desired 2,4'-dichlorobiphenyl was present in substantially equivalent amount to the process of Example 3, but the ratio of 4,4'-/2,2'-isomers was substantially reduced, i.e. from about 2.4 to about 1.4 by withholding the introduction of the sulfur modifier until the reaction mixture was at about the monochlorinated stage. The 4,4'-dichlorobiphenyl component of the reaction mixture can be substantially removed by fractional crystallization at about room temperature as in Example 3, and the balance of the reaction mixture fractionally distilled to recover the 2,4'-dichlorobiphenyl, which can then be further chlorinated to the trichlorobiphenyl stage in the presence of ferric chloride in a similar manner to Examples 1 and 2.

*Example 5*

A larger batch experiment similar to Example 3 was run wherein 308 g. (2 mols) of biphenyl, 1.3 g. of ferric chloride and 0.75 g. of sulfur were mixed together in a closed reaction vessel and chlorine introduced over a temperature range of about 90° to about 120° C. until a weight increase of 138 g. was obtained. The reaction mixture was then dissolved in a mixture of 200 ml. pentane and 300 ml. benzene, dried over magnesium sulfate, treated with decolorizing carbon, filtered, and the solvents distilled from the filtrate. The 4,4'-dichlorobiphenyl component was then crystallized out of the reaction mixture and separated therefrom. Then the reaction mixture was fractionally distilled to obtain the 2,4'-dichlorobiphenyl. A 40-g. sample of the 2,4'-dichlorobiphenyl cut was then chlorinated in the presence of 0.1 g. ferric chloride to the trichlorobiphenyl stage at a temperature of about 120° to about 130° C. over a time of about 0.5 hour. The product was distilled from the catalyst and its electrical properties evaluated, which were found to be substantially equivalent to the values reported in Example 1.

Whereas ferric chloride has been employed in the aforesaid illustrative examples, it will be understood that other strong Lewis acids, i.e. cationoid or electrophilic reagents, can be employed therefor in whole or in part, or as mixed compositions, including aluminum chloride, stannic chloride, zinc chloride, antimony trichloride, boron trifluoride, and the like. The quantity of the various strong Lewis acid catalysts employed in this reaction can be varied as shown for the illustrative ferric chloride times the ratio of the molecular weight of the particular material selected to the molecular weight of ferric chloride.

I claim:
1. A method of producing an improved dielectric composition comprising the halogenation of a halobiphenyl composition, containing at least about 80 mol percent of 2,4'-dihalobiphenyl, to provide a composition containing an average of about 3 halogen atoms per molecule of biphenyl, wherein the said halogen atoms have an atomic number up to 53, in the presence of from about 0.05 to about 1.0 weight percent of a strong inorganic metallic-metalloid halide Lewis acid catalyst, having a relative strength of zinc chloride and higher, based on the 2,4'-dihalobiphenyl composition, wherein said catalyst weight percent is multiplied by the ratio of the molecular weight of the said strong Lewis acid catalyst to the molecular weight of ferric chloride, the halogenation action is carried out from about 80° C. to about 150° C., and the 2,4',X-trihalobiphenyl composition, wherein X is a halogen atom substituent to the biphenyl molecule located at other than the 2 and 4' positions, is characterized by a dielectric constant at 25° C. of about 7 and higher at up to 100,000 cycles.

2. The method of claim 1, wherein the halogen atoms are chlorine and the 2,4'-dichlorobiphenyl is chlorinated to the 2,4',X-trichlorobiphenyl composition.

3. The method of claim 2, wherein the Lewis acid catalyst is ferric chloride.

4. The method of claim 2, wherein the strong Lewis acid catalyst is selected from the group consisting of ferric chloride, aluminum chloride, stannic chloride, zinc chloride, antimony trichloride, boron trifluoride and mixtures thereof.

5. A method of producing an improved dielectric composition comprising the halogenation of biphenyl in the presence of from about 0.05 to about 1.0 weight percent of a strong metallic-metalloid inorganic halide Lewis acid catalyst, having a relative strength of zinc chloride and higher, wherein said catalyst weight percent is multiplied by the ratio of the molecular weight of the particular Lewis acid catalyst to the molecular weight of ferric chloride, and from about 0.025 to about 0.5 weight percent of finely divided sulfur, each based on biphenyl, at a temperature of from about 40° C. to about 150° C., to effect the introduction of about two atoms of halogen per molecule of biphenyl, wherein the said halogen atoms have an atomic number up to 53, separating the 2,4'-dihalobiphenyl from the reaction mixture such that the separated composition contains at least about 80 mol percent of 2,4'-dihalobiphenyl, then further halogenating the 2,4'-dihalobiphenyl in the presence of said strong Lewis acid catalyst at a temperature of from about 80° C. to about 150° C. to introduce an additional halogen atom thereto and recovering the 2,4',X-trihalobiphenyl composition, wherein X is a halogen atom substituent to the biphenyl molecule located at other than the 2 and 4' positions, characterized by a dielectric constant at 25° C. of about 7 and higher at up to 100,000 cycles.

6. The method of claim 5, wherein the halogen atoms are chlorine.

7. The method of claim 5, wherein the separation of the 2,4'-dihalobiphenyl composition is effected by fractional distillation.

8. The method of claim 6, wherein the Lewis acid catalyst is ferric chloride.

9. A method of producing an improved dielectric composition comprising the halogenation of biphenyl in the presence of from about 0.05 to about 1.0 weight percent, based on the biphenyl, of a strong inorganic metallic-metalloid halide Lewis acid catalyst, having a relative strength of zinc chloride and higher, wherein said catalyst weight percent is multiplied by the ratio of the molecular weight of the particular Lewis acid catalyst to the molecular weight of ferric chloride, at a temperature of from about 40° C. to about 150° C. to introduce about one atom of halogen per mole of biphenyl, then adding from about 0.025 to about 0.5 weight percent, based on the essentially monohalobiphenyl, of finely divided sulfur to the reaction mixture and continuing the halogenation until a second atom of halogen has been introduced, wherein the said halogen atoms have an atomic number up to 53, separating the 2,4'-dihalobiphenyl from the reaction mixture such that the separated composition contains at least about 80 mol percent of 2,4'-dihalobiphenyl, then further halogenating the 2,4'-dihalobiphenyl in the presence of said strong Lewis acid catalyst to introduce an additional halogen atom thereto and recovering the 2,4',X-trihalobiphenyl composition, wherein X is a halogen atom substituent to the biphenyl molecule located at other than the 2 and 4' positions, characterized by a dielectric constant at 25° C. of about 7 and higher at up to 100,000 cycles.

10. The method of claim 9, wherein the halogen atoms are chlorine.

11. The method of claim 9, wherein the separation of the 2,4'-dihalobiphenyl composition is effected by fractional distillation.

12. The method of claim 10, wherein the Lewis acid catalyst is ferric chloride.

13. A method of producing an improved dielectric composition comprising the chlorination of biphenyl in the presence of from about 0.08 to about 1.6 weight percent of stannic chloride, based on the biphenyl, at a reaction temperature of from about 40° C. to about 150° C. to effect the introduction of about two atoms of chlorine per molecule of biphenyl, separating the 2,4'-dichlorobiphenyl from the reaction mixture such that the separated composition contains at least about 80 mol percent of 2,4'-dichlorobiphenyl, then further chlorinating the 2,4'-dichlorobiphenyl in the presence of from about 0.05 to about 1.0 weight percent of ferric chloride, based on the 2,4'-dichlorobiphenyl composition, at a reaction temperature of from about 80° C. to about 150° C. to introduce an additional chlorine atom thereto and recovering the 2,4',X-trichlorobiphenyl composition, wherein X designates the position of the third chlorine atom, characterized by a dielectric constant at 25° C. of about 7 and higher at up to 100,000 cycles.

14. A dielectric composition consisting essentially of a mixture of 2,4',X-trihalobiphenyls, wherein X designates the position of the third halogen atom, prepared by the halogenation of a halobiphenyl composition, containing at least about 80 mol percent of 2,4'-dihalobiphenyl, to contain a total of about 3 halogen atoms per molecule of biphenyl, wherein said halogen atoms have an atomic number up to 53, in the presence of from about 0.05 to about 1.0 weight percent of a strong inorganic metallic-metalloid halide Lewis acid catalyst having a relative strength of zinc chloride and higher, based on the 2,4'-dihalobiphenyl composition, wherein said catalyst weight percent is multiplied by the ratio of the molecular weight of the said strong Lewis acid catalyst to the molecular weight of ferric chloride, the halogenation reaction is carried out at a temperature of from about 80° C. to about 150° C., and said dielectric composition is characterized by a dielectric constant at 25° C. at up to 100,000 cycles of about 7 and higher.

15. A dielectric composition consisting essentially of a mixture of 2,4',X-trihalobiphenyls, wherein X designates the position of the third halogen atom, prepared by the halogenation of a halobiphenyl composition, containing at least about 80 mol percent of 2,4'-dihalobiphenyl, to contain a total of about 3 halogen atoms per molecule of biphenyl, wherein said halogen atoms have an atomic number up to 53, in the presence of from about 0.05 to about 1.0 weight percent of a strong Lewis acid catalyst selected from the group consisting of ferric chloride, aluminum chloride, stannic chloride, zinc chloride, antimony trichloride, boron trifluoride and mixtures thereof, based on the 2,4'-dihalobiphenyl composition, wherein said catalyst weight percent is multiplied by the ratio of the molecular weight of the strong Lewis acid catalyst to the molecular weight of ferric chloride, the halogenation reaction is carried out at a temperature of from about 80° C. to about 150° C., and said dielectric composition is characterized by a dielectric constant at 25° C. at up to 100,000 cycles of about 7 and higher.

16. An electrical capacitor comprising metal foil electrodes separated by a porous dielectric substance impregnated with the 2,4',X-trihalobiphenyl composition, wherein X is a halogen atom substituent to the biphenyl molecule located at other than the 2 and 4' positions, of claim 14.

17. The electrical capacitor of claim 16, wherein the halogen atoms are chlorine.

References Cited in the file of this patent
UNITED STATES PATENTS 1,892,397 Jenkins _____ Dec. 27, 1932

FOREIGN PATENTS 45,371 France _____ July 26, 1935

OTHER REFERENCES

McLean et al.: "Paper Capacitors Containing Chlorinated Impregnants," Ind. and Eng. Chem., vol. 38, No. 11, November 1946, pp. 1110–1116.

Chem. Abstracts, vol. 28, p. 1686$^3$; vol. 30, pp. 2186$^5$, 2186$^6$, 2186$^9$; vol. 50, p. 2504$^h$.